UNITED STATES PATENT OFFICE.

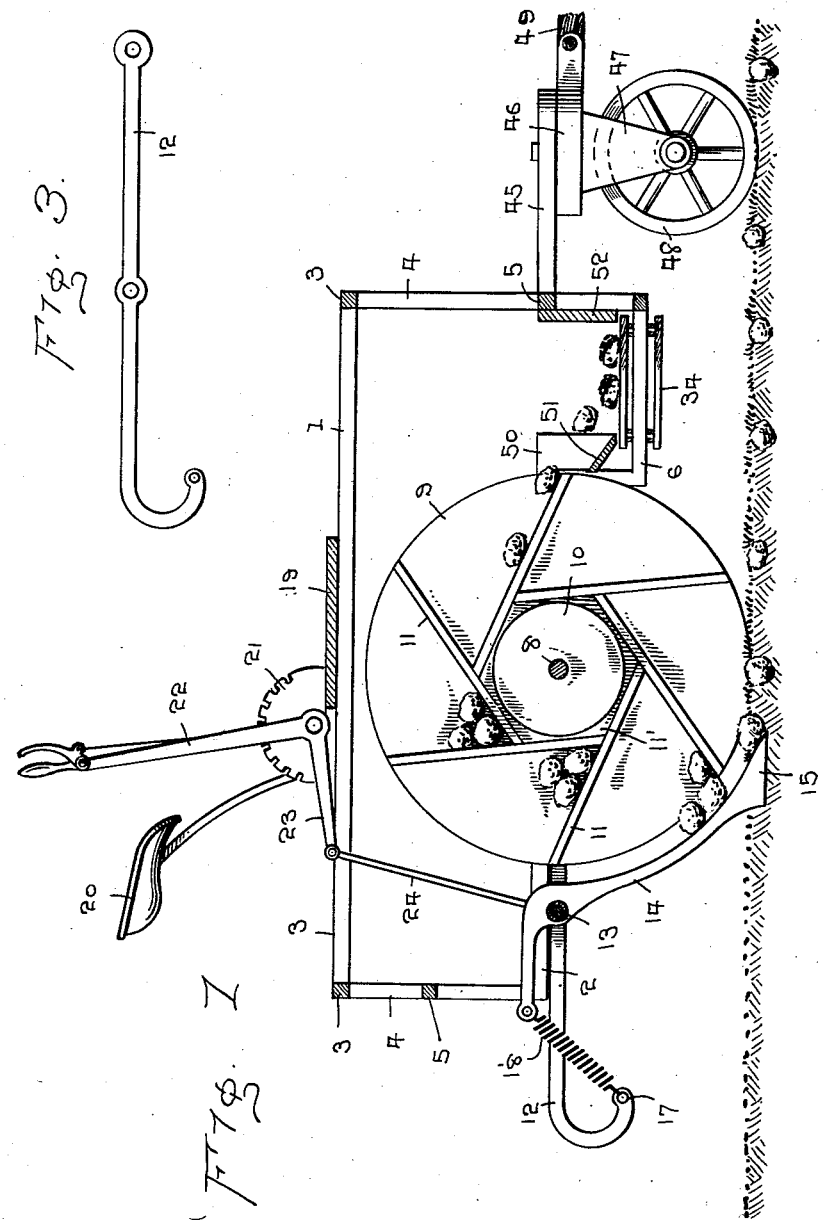

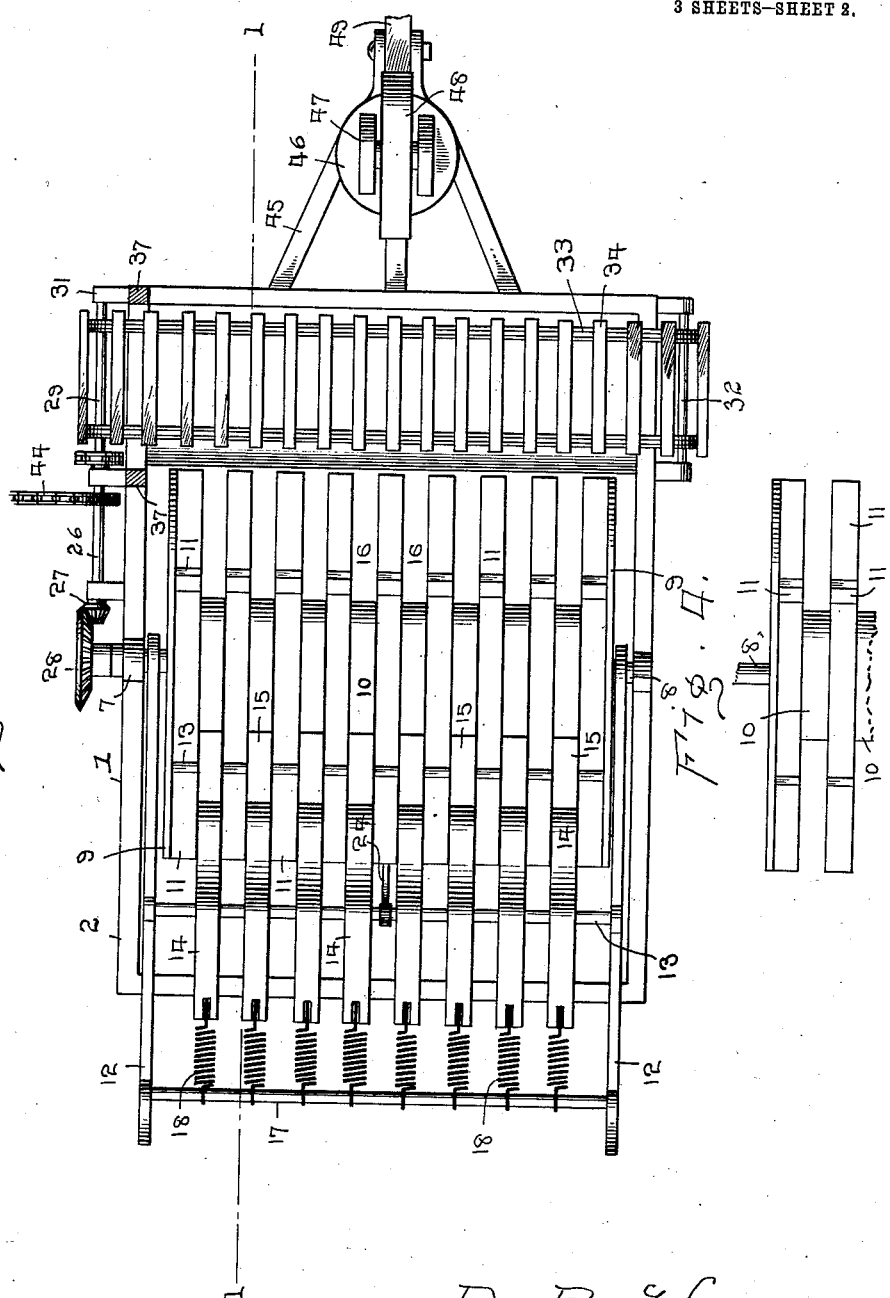

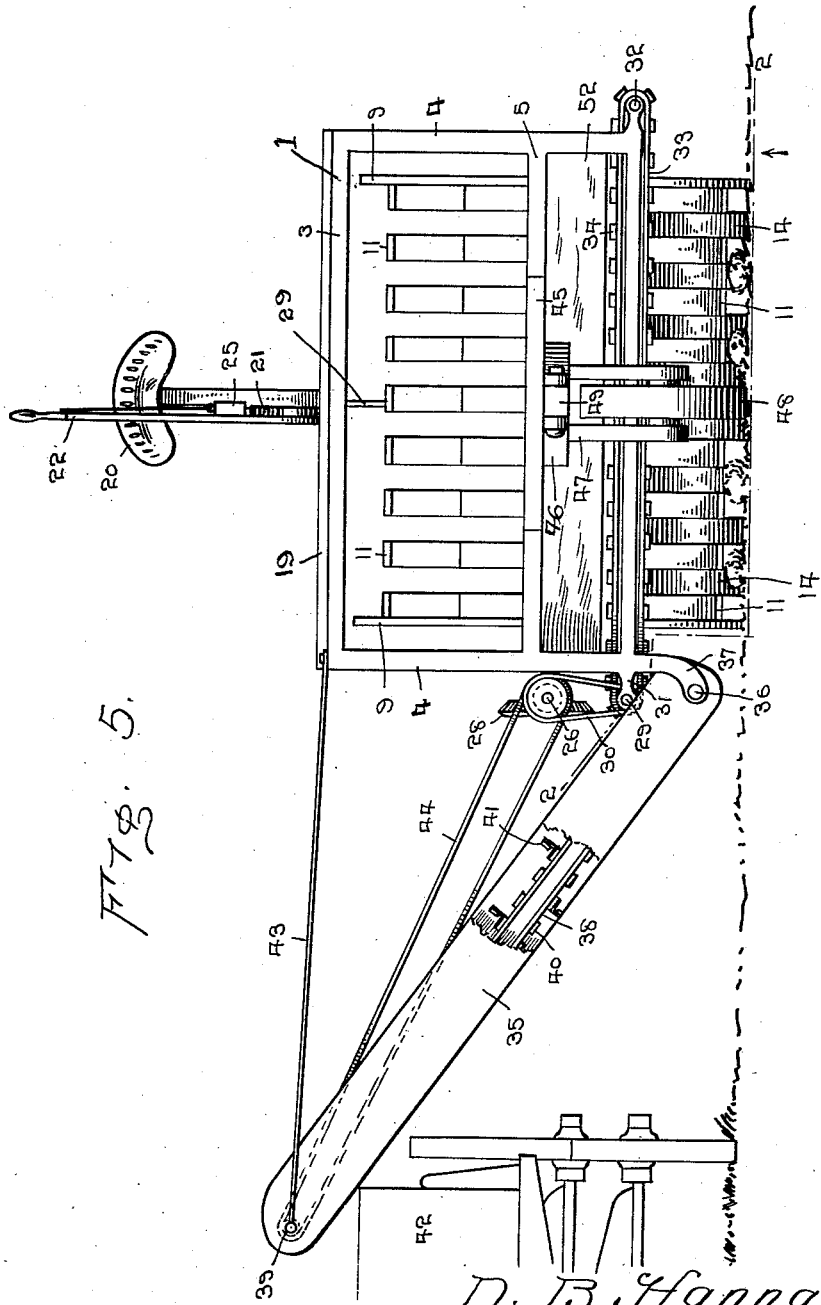

DENNIS B. HANNAN, OF GRAVETTE, ARKANSAS, ASSIGNOR OF ONE-THIRD TO JOHN A. NEWHOUSE AND ONE-THIRD TO JOSEPH A. BOECKER, OF PARSONS, KANSAS.

ROCK-GATHERER.

1,116,885.  Specification of Letters Patent.  Patented Nov. 10, 1914.

Application filed July 31, 1913. Serial No. 782,219.

*To all whom it may concern:*

Be it known that I, DENNIS B. HANNAN, a citizen of the United States, residing at Gravette, in the county of Benton and State of Arkansas, have invented certain new and useful Improvements in Rock-Gatherers; and I do hereby declare the following to be a full, clear, and exact description of the invention, such as will enable others skilled in the art to which it appertains to make and use the same.

This invention relates to farming implements and more particularly to a machine for removing rocks from the ground, or for harvesting potatoes or other crops which grow in the ground.

One of the principal objects of my invention is to provide a machine of the class described which will gather rocks, and deposit the same in a wagon or other carrier.

Another object of my invention is to provide a machine embodying means for gathering rocks which may be of different depths in the soil.
A further object of my invention is to provide a machine of the class described which will be simple, durable, efficient in operation, and inexpensive to manufacture.

With these and other objects, the invention consists in the construction, combination and arrangement of parts, hereinafter more fully described and claimed and illustrated in the accompanying drawings, in which like reference characters indicate like parts throughout the several views, and in which, Figure 1, represents a vertical sectional view taken on the line 1—1 of Fig. 2. Fig. 2, represents a bottom plan view of the machine, a section being taken on the line 2—2 of Fig. 5. Fig. 3, represents a side elevational view of one of the shoe carrying bars. Fig. 4, represents a top plan view of a portion of the drum and fingers secured thereon, and Fig. 5, represents a front elevational view of the machine.

In carrying out my invention, I provide a substantially rectangular frame 1, of angle iron or other suitable material, said frame comprising lower horizontal bars 2, upper horizontal bars 3, vertical corner bars 4, and cross bars 5. The front ends of the lower horizontal bars 2, are offset as at 6, said offset portions being below the plane of the rear end of said bars 2. Journaled in brackets 7, on the bars 2, and extending crosswise of the frame, is a shaft 8, which is adapted to rotate in said journals and which has secured thereto, near opposite sides of the frame, a pair of disks or wheels 9, and these wheels are connected by means of a drum 10, which encircles the shaft 8 between the wheels. Secured at spaced intervals on the drum 10, are a plurality of blocks 11', which are six sided on their outer edges and to each of the sides is secured a finger 11, formed of a bar of metal. The inner end of each finger abuts against the finger immediately to the rear of it, and the outer ends of the fingers are on a line with the outer periphery of the wheels 9. Pivoted near opposite ends of the shaft 8, and between the wheels 9 and the horizontal bars 2, are the forward ends of shoe supporting bars 12, said bars supporting at their middle points a shaft 13, to which are independently pivoted a plurality of shoe shanks 14, which are formed integral with shoes 15, adapted to engage the earth for gathering rocks as the machine travels along. Each of the shoes 15, is positioned in one of the spaces 16 between the fingers 11, so that as said fingers revolve, they may engage the rocks uprooted by the shoes 15, as shown in Fig. 1. The rear ends of the bars 12 are turned downwardly and support a cross bar 17, to which are secured the lower ends of a plurality of springs 18, the upper ends of said springs being secured individually to the rear ends of the shoe shanks 14, said rear ends being bent at an angle to said shanks, to extend rearwardly therefrom.

A cross board 19, is secured on the frame centrally of the upper horizontal bars 3 thereof, and said board supports a driver's seat 20, and a toothed segment 21, to which is pivoted a bell crank lever 22, the arm 23, of which is engaged by means of a link 24 to the central portion of the shaft 13, whereby when said bell crank lever is rocked, the shoes 15 may be raised or lowered. The usual dog 25, is provided on the lever 22, whereby the shoes 15 may be held at any predetermined depth by raising or lowering the bars 12, on their pivot. The bar 13, to which the shoe shanks 14, are secured, is spaced somewhat to the rear of the wheels 9, so that a space is left between the shanks 14 and the ends of the fingers 11, whereby stones uprooted by the shoes 15, may be gathered on the fingers. A countershaft 26 is secured by brackets to one of the lower horizontal bars 2 of the frame, and this shaft carries a pinion 27 which is geared with a beveled wheel 28 carried by one end of the shaft 8. The shaft 26, is provided with a pair of sprocket wheels, one of which is adapted to actuate a conveyer shaft 29, by means of a chain 30, said shaft 29, being journaled in brackets 31, secured to one of the lower offset portions 6 of one of the bars 2. A shaft 32 corresponding to the shaft 29, is journaled by means of brackets on the opposite side of the frame from the shaft 29, and these shafts co-act for carrying a conveyer belt 33, which is provided with cross bars 34, for delivering the stones gathered by the fingers 11 to an elevator 35.

The elevator is pivoted by means of a lower shaft 36, to a pair of depending brackets 37, formed on the frame, below the brackets 31, and that shaft 36 carries one end of an elevator belt 38, the opposite end is carried by a shaft 39, in the upper end of the elevator 35. Cross bars 40, are provided on the belt 38, and certain of said cross bars have plates 41, secured thereto for holding stones as the same are carried upward to be delivered in a wagon or other carrier 42. The elevator is braced by means of rods 43, secured at one end to the elevator sides and at the opposite end to the frame of the machine. The shaft 39 carries a sprocket wheel actuated by a chain 44, which runs over one of the sprocket wheels on shaft 26.

Secured centrally of the forward cross bar 5, of the frame, is a substantially U-shaped bracket 45 under the forward end of which is pivoted a disk or wheel 46, which carries brackets 47, between the lower ends of which is journaled a front wheel 48, for guiding the machine, and a tongue 49, is bolted to the disk 46, said tongue adapted to have draft animals hitched thereto. Above the rear edge of the conveyer 33, and secured to the frame of the machine, is a chute 50, having end walls and an inclined bottom 51, adapted to guide stones on to the conveyer as they are delivered from the fingers 11 of the machine, and a board 52, is secured to the frame to prevent the stones from rolling off of the conveyer.

As the machine is drawn over the ground, the shoes 15, will disengage the stones from the soil and as the fingers revolve on the axle 8, they will engage the stones, and as the fingers assume an upright position in traveling about their axis, the stones will be deposited in the pockets formed by the adjacent fingers as illustrated in Fig. 1, until as the fingers are further rotated, the rocks will be deposited through the chute 50, on to the conveyer 33 from which they will be deposited on to the elevator 35, which will in turn deposit them into the carrier. In practice, the fingers will be spaced about two inches apart, and it will be evident that any stones less than two inches in length, will fall out through the spaces left between the fingers, as will also the dirt or other foreign matter, only such stones as are greater than two inches in length, being retained on the fingers, will be deposited on to the conveyer.

It is of course to be understood that the dimensions of the machine are optional, and that the distance which the fingers will be set apart, depends upon the nature of the soil to be treated.

Should any stones too large to be accommodated, be encountered by the shoes, the latter may be raised by means of the lever 22, so as to allow the shoes to pass over such stones, without injury to the machine. By reason of the springs 18, the shoes will have a give as the stones are engaged, and thus there will be no danger of the shanks being broken during the operation of the machine.

While I have described the machine as adapted for gathering rocks, it is evident that it may be used as a potato harvester or harvester of other crops which grow in the soil, the uses to which the machine may be put being optional of its user.

Although I have described the preferred embodiment of my invention, I may desire to make such changes in the construction, combination and arrangement of parts as do not depart from the spirit of the invention and the scope of the appended claims.

Having thus fully described my invention, what I claim as new and desire to secure by Letters-Patent is:

1. A machine of the class described providing a frame, an axle journaled therein, supporting bars journaled on said axle, shoes carried by said supporting bars and adapted to engage rocks in the soil, spring connections between said shoes and supporting bars, means carried on said axle for depositing the rocks on to a conveyer, and means for raising and lowering said shoes.

2. A machine of the class described comprising an axle, a shaft journaled therein, supporting bars pivoted on said axle, a shaft carried by said supporting bars, shoe shanks independently pivoted on said shaft, shoes carried by said shanks, a cross bar carried by said supporting bars, springs secured at one end to said shanks and at the opposite end to said cross bar, spaced fingers carried by said axle, said shoes situated at the spaces between said fingers, and means for raising and lowering said shoes.

3. In a device of the character described, the combination of a picking device comprising a frame, a transverse shaft journaled thereon, a drum encircling said shaft, approximately hexagonal blocks mounted upon said drum, fingers attached to said blocks, the rear end of said fingers meeting the face of the succeeding finger, a second transverse shaft mounted upon said frame, independent and loosely mounted shanks having integral shoes thereto mounted upon said second transverse shaft, said shank and shoes running in spaced parallelism to the periphery of said fingers, said shoes loosening stones or the like and said pickers lifting them; and a plurality of springs, one spring connected to each of the upper ends of said shanks, and said springs connected to a cross bar of said frame as and for the purpose specified.

In testimony whereof I have signed my name to this specification in the presence of two subscribing witnesses.

DENNIS B. HANNAN.

Witnesses:
 JAS. BANKS,
 WM. FRAZER.